Figure 5:
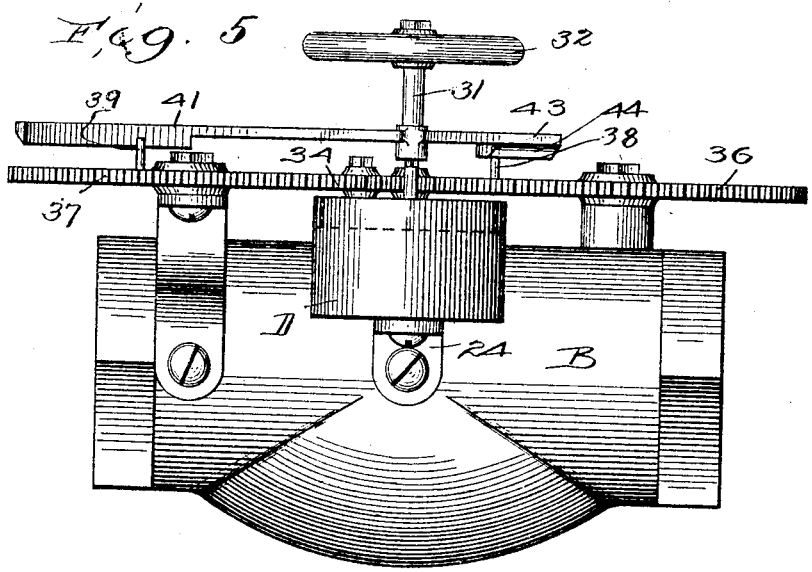

No. 805,874. PATENTED NOV. 28, 1905.
J. G. & J. D. NOLEN.
AUTOMATIC FIRE EXTINGUISHER SYSTEM.
APPLICATION FILED SEPT. 11, 1902.
4 SHEETS—SHEET 1.
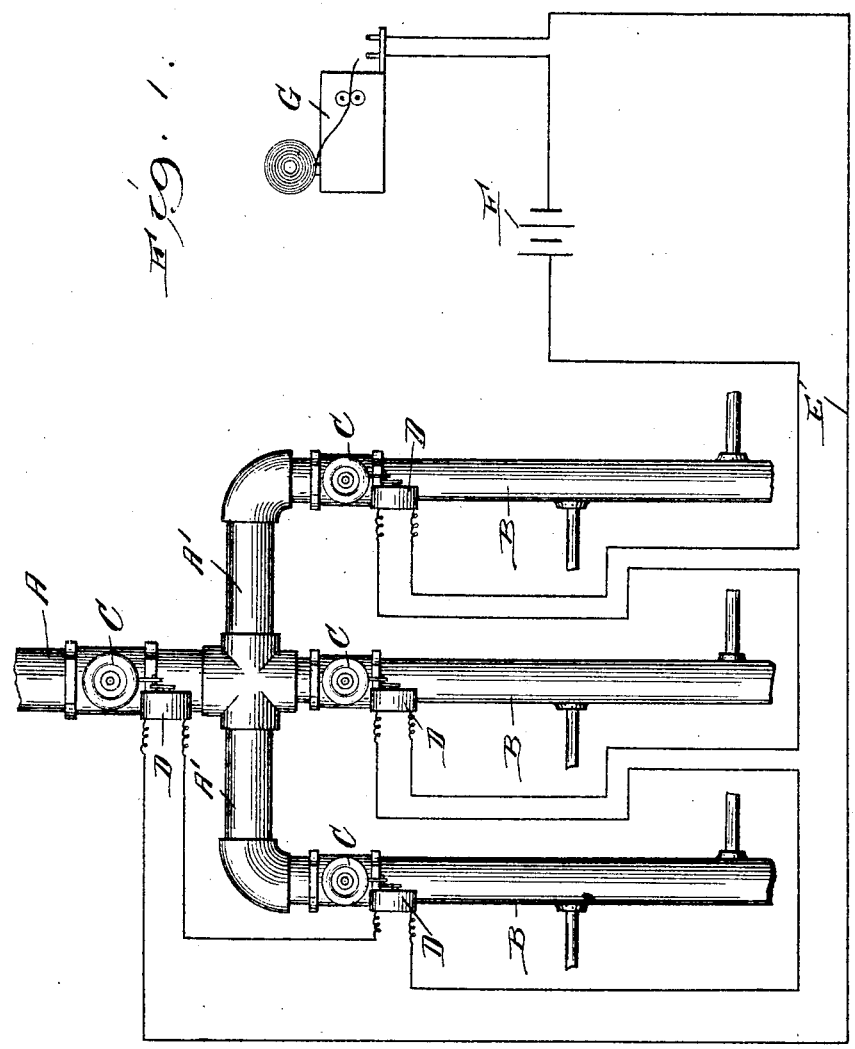

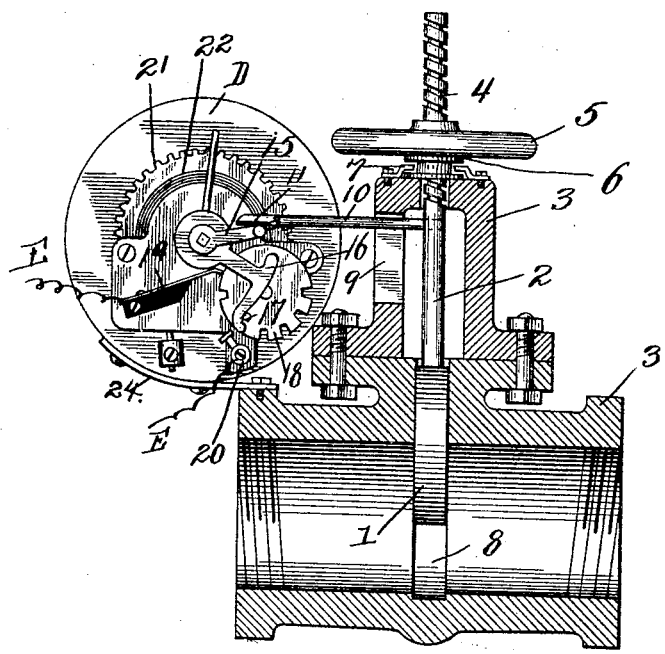
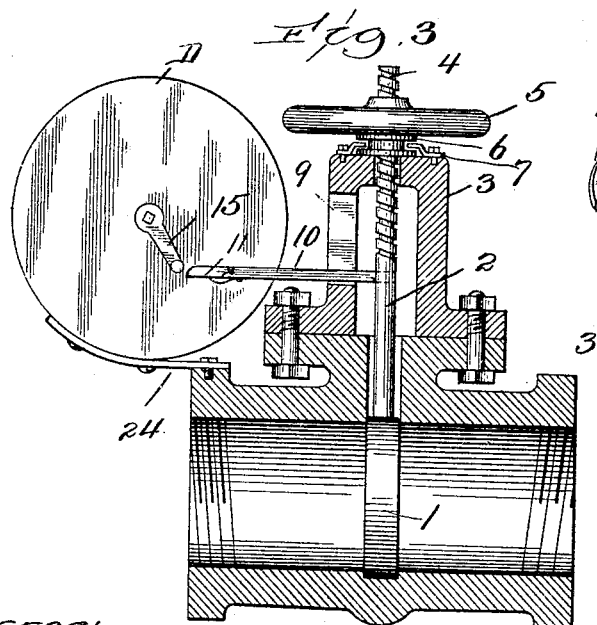
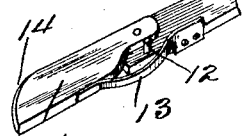

No. 805,874. PATENTED NOV. 28, 1905.
J. G. & J. D. NOLEN.
AUTOMATIC FIRE EXTINGUISHER SYSTEM.
APPLICATION FILED SEPT. 11, 1902.
4 SHEETS—SHEET 4.
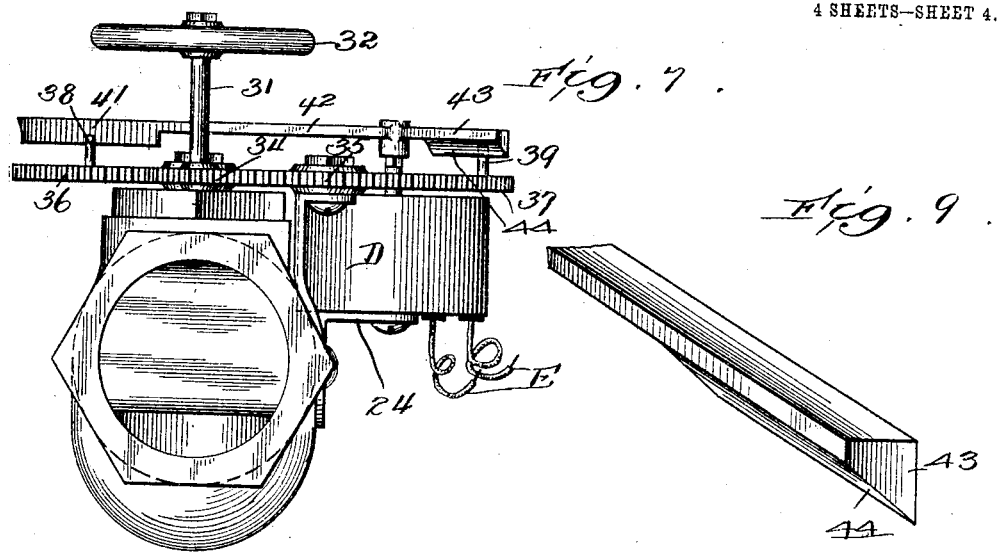
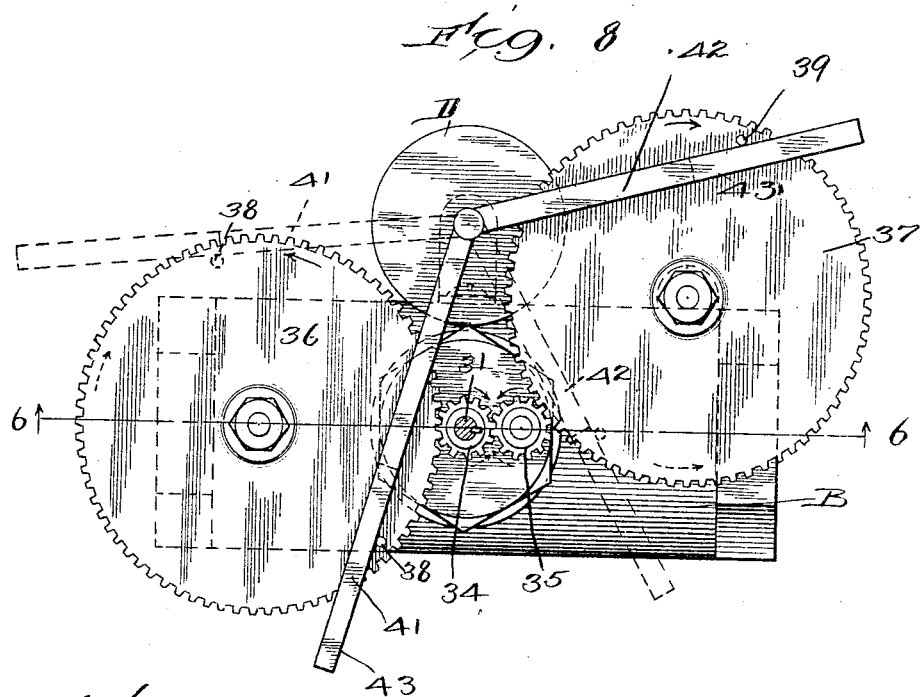

UNITED STATES PATENT OFFICE.

JAMES G. NOLEN, OF CHICAGO, ILLINOIS, AND JOHN D. NOLEN, OF TOLEDO, OHIO; SAID JOHN D. NOLEN ASSIGNOR TO SAID JAMES G. NOLEN; SAID JAMES G. NOLEN ASSIGNOR OF ONE-HALF TO FRANK B. COOK, OF CHICAGO, ILLINOIS.

AUTOMATIC FIRE-EXTINGUISHER SYSTEM.

No. 805,874.  Specification of Letters Patent.  Patented Nov. 23, 1905.

Application filed September 11, 1902. Serial No. 122,925.

*To all whom it may concern:*

Be it known that we, JAMES G. NOLEN, of Chicago, in the county of Cook and State of Illinois, and JOHN D. NOLEN, of Toledo, in the county of Lucas and State of Ohio, have invented certain new and useful Improvements in Automatic Fire-Extinguisher Systems; and we hereby declare that the following is a full, clear, and exact description thereof, reference being had to the accompanying drawings, which form part of this specification.

Our invention relates to automatic fire-extinguisher systems, and has for its object to provide means whereby supervision may be maintained over a plurality of such systems by a central station in order that they may be maintained constantly in operative condition.

In automatic fire-extinguishing systems it is common to provide in each building to be protected a system of branch distributing-pipes emanating from a main or header directly connected with the source of water supply and to provide each of the branch pipes and the header with a valve adapted to remain normally open in order that the distributing-pipes may be constantly kept filled with water. It is sometimes necessary, however, to close the valves in order that repairs in the system may be effected or for other purposes, and in the event that said valves are not reopened the system or some portion thereof is totally disabled by the cutting off of the water-supply therefrom. It is with a view to enabling those interested in the safety of buildings equipped with such systems—as, for example, their owners or the fire underwriters—to maintain a supervision over the condition of the cut-off valves that our invention is designed; and to this end it consists in providing, in conjunction with each cut-off valve of the extinguishing system, an automatic signal-transmitting box arranged in electical circuit with suitable indicating devices at a central station, whereby upon the manipulation of the valve a signal will be sent into the central office, by which the supervising operator is notified of the closing of the valve.

Our invention further consists in certain features and details of construction and arrangement of the devices employed, which will be hereinafter more fully described, and pointed out in the claims.

Figure 6:
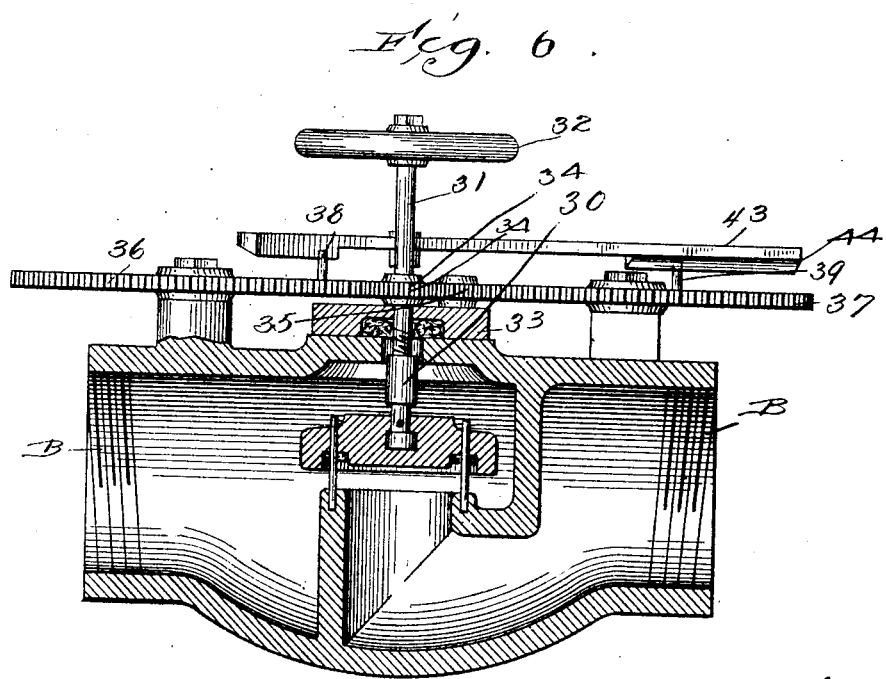

In the drawings, Figure 1 represents diagrammatically an automatic fire-extinguishing system equipped with our invention. Fig. 2 illustrates in sectional elevation one form of cut-off valve arranged to operate a signal device, the signal-box being shown with its cover removed to expose the interior mechanism. Fig. 3 is a similar view of the valve in closed position, showing the signal-box in side elevation. Fig. 4 is a perspective detail of a portion of the signal-box-operating arm associated with the valve. Fig. 5 is a side elevation of a modified form of signal-box-operating means and valve. Fig. 6 is a central vertical section through the same, taken on line 6 6 of Fig. 8. Fig. 7 is an end elevation of the form of valve and signal-operating mechanism illustrated in Fig. 5. Fig. 8 is a top plan view of the same. Fig. 9 is a detail perspective view of one of the signal-box-operating levers.

In Fig. 1, A represents a source of water-supply communicating with a header or distributing-pipe A', from which emanates a series of branch pipes B B, provided with suitable spraying or sprinkling devices of any approved pattern in a manner well known in the art. The inlet from the main A to the header A' and the connections between said header and the distributing-pipes B B are each provided with a suitable cut-off valve C, adapted to remain normally open to permit said pipe to be filled with water from the source of supply. D D represent a series of signal-boxes of an ordinary type—such, for instance, as those used in messenger-calls to indicate station-numbers by breaking an electric circuit—one being arranged adjacent to each valve and connected thereto by means to be hereinafter described, so that the said signal-box will be caused to operate whenever the valve is moved to closed position. Said signal-boxes D are arranged in series in an electric circuit E, communicating with a suitable central station and there provided with a battery F or other source of electrical supply and an indicating or recording device, such as the ordinary tape recorder used in messenger-call systems and conventionally indicated at G.

Referring now to Figs. 2 to 4, wherein is illustrated one operative means of actuating the alarm-box D when the valve is closed, 1 represents a valve-head, and 2 the stem thereof, projecting from the valve-casing 3. The stem 2 is screw-threaded, as at 4, to receive a wheel-handle 5, having a grooved hub 6. 7 represents clips secured to the top of the valve-casing 3, projecting into the groove in the hub 6 of the hand-wheel 5, thereby securing the latter against axial movement, but leaving it free to rotate. The valve-head 1 is guided in suitable grooves 8 in the casing 3, so that when the hand-wheel 5 is rotated the valve and stem are axially moved, as will be readily understood. 9 is a slot in the valve-casing 3, through which projects an arm 10, rigidly secured to the valve-stem 2. Said arm is provided at its end with a pivoted finger 11, held against movement in one direction by a pin or stop 12 and yieldingly supported in the other direction by leaf-spring 13, secured to the arm 10 and bearing at its free end against the finger. The end of the finger is preferably curved, as indicated at 14.

In Fig. 2 the mechanism of a conventional signal-box D is partly illustrated. 15 indicates an exterior handle secured to a controlling-lever 16, provided with a head serving as a stop for a pin 17, carried by a contact-disk 18, having in its periphery suitable notches adapted to break electrical circuit when the disk is rotated, the controller-lever being arranged to release the pin 17 when the handle 15 is depressed. 19 is a brush arranged to contact with the periphery of the disk 18 and forming one terminal of the electric circuit E. Said brush is suitably insulated from the frame supporting the signal mechanism. 20 is a binding-post electrically connected by the framework with the disk 18 and serving as the other terminal of circuit E. 21 is one of the driving-gears for the disk 18, and 22 is a spring tending to restore the parts to the condition shown in Fig. 2, when the handle is depressed and released. These parts are all of well-known construction and need no detailed description. The signal-box is secured to the valve-casing upon a suitable support 24, so that the finger 11 of the arm 10, secured to the valve-stem, intersects the path of oscillation of the handle 15 of the signal-box and rests upon the handle 15 when the signal-box is in normal or operative condition and the valve is closed.

The operation of the mechanism described will be as follows: The parts being in position shown in Fig. 2, with the valve opened and the signal-box handle in its normal position, rotation of the valve-handle 5 to close the valve causes the stem 2 to descend, carrying with it the arm 10. The finger 11 of the arm 10 being unyielding in an upward direction carries the handle 15 of the signal-box downward with it in its movement until the controller-lever 16 of the said box releases the pin 17 of the contact-disk 18 therefrom, at which time the handle 15 escapes from the finger 11, as illustrated in Fig. 3. The spring 22, acting through a suitable train of gearing, now causes the handle 15 to restore itself to its initial position and at the same time causes the disk 18 to make a complete revolution, so that the notches in its periphery will break the circuit extending from the battery F through one wire of circuit E, the signal-boxes D in series, the other wire of the circuit E, the recorder G, and back to the battery at suitable intervals. These breaks in the said circuit cause the instrument D therein to make a suitable record thereof in the usual manner, and the central operator is apprised of the number of the box from which the signal is sent in. The central office may thus be enabled to keep informed as to the condition of the valves in the extinguisher systems under its control.

In the practice of our invention it may be found desirable to employ a signal-actuating device which will operate both when the valve is opened and closed, so that in case the valve be opened within a reasonable time after the closing thereof the central station may be notified to that effect and relieved from the necessity of investigating the cause of the closing of the valve. In Figs. 5 to 9, therefore, is illustrated a modified embodiment of our invention designed to accomplish this result. Valve B is shown as of a reciprocating type, provided with a screw-threaded socket 30, adapted to receive the screw-threaded end of a revoluble axially stationary stem 31. Said stem is provided with a handle 32 and has secured thereto in proximity to the valve-casing 33 a driving-pinion 34. 35 is a pinion in size equal to the pinion 34 and meshing with the latter. 36 and 37 are two large gears of equal size meshing, respectively, with the gear 34 and the pinion 35. The pinion 35 and gears 36 and 37 are mounted upon suitable studs projecting from the valve-casing 33 or other suitable supports associated with said valve-casing. 38 is a stud or pin projecting from the face of gear 36, and 39 is a similar pin arranged to project from the gear 37. D indicates the signal-box secured to the valve-casing by suitable brackets 24 and provided with two operating-levers 41 and 42, arranged in angular relation to each other, so that one normally overlies the face of the gear 36, while the other is similarly related to the gear 37. The lever-arms 41 and 42 should be formed of spring metal, preferably, relatively thin and laterally extended, so that they may readily spring away from the gears, but are inflexible in a direction of rotation. Each of said arms is provided at its extremity with a head 43, having a beveled rear face 44, as shown at Fig. 9. When the parts are in the position shown in Fig. 8, so that when the valve is open and the signal-box in operative condition, the pin 39 of the gear 37 will be in contact with the straight front face of the head 43 of arm 42, and the pin 38 upon the gear 36 will be in contact with the front face of the arm 41. If now the valve-handle 32 be rotated to the right, the pinion 34 and the train associated therewith will be turned in the directions indicated by the solid arrows in Fig. 8, and the movement of the gear 37, communicated to lever 43 through pin 39, will move the cam-lever arm 42 to the position shown in dotted lines in Fig. 8, when the pin 39 will pass beyond the inward extremity of the head 43 of the arm, releasing the latter and allowing it to return to its initial position under the influence of the spring forming part of the signal-box mechanism. Upon the other side of the valve the pinion 36 rotates in a direction opposite to that of gear 37, so that during the revolution of the said gear 36 the pin 38 thereon will meet the beveled rear face of head 43 of lever 41 and pass thereunder, the arm 41 yielding to permit the pin to escape. The parts are so arranged that a complete revolution of each of the large gears is effected when the valve is moved from open to closed position. Thus it will appear that upon the valve being closed the parts will again occupy the initial position, as shown in full lines in Fig. 8; but upon moving the valve-handle to open the valves again the handle must be turned to the left and the gearing revolved in the direction indicated by the dotted arrows. Now the pin 38 upon the gear 36 presses against the head 43 of the arm 41 and moves the same to the dotted position, the pin 39 upon the gear 37 during its movement passing beneath the arm 42 in the manner before described. It will be seen that the movement of the valve in either direction causes the signal-box to be operated and a signal to be transmitted through the circuit E.

It is contemplated that when a device such as that shown in Figs. 1 to 4 of the drawings is employed, so that a signal is sent only when the valve is closed, the authorities at the central station will investigate the condition of the valve at each station from which a call is sent in after a reasonable time in order to insure that the said valve is again properly opened. If, however, a device like that illustrated in Figs. 5 to 9 be employed, the first call received from a box is merely noted, and if a second call be received from the station bearing the same number within a reasonable time the authorities at the central station are relieved of the necessity of investigating the station, as the second call indicates that the valve has been again opened.

It will be apparent that while we have described in detail certain operative devices employed in the practice of our invention numerous changes may readily be made therein without departing from the spirit and scope of our invention, and we do not, therefore, desire to be limited to the specific details of construction herein set forth for the purpose of affording a full disclosure of the said invention.

Having described our invention, what we claim as new, and desire to secure by Letters Patent of the United States, is—

1. The combination with a valve of a fire-extinguisher system, of a transmitter adapted to transmit a plural-impulse signal, a signal-responsive device, suitable circuit connections for said transmitter and responsive device, and means for actuating said signal-transmitter to cause it to transmit a signal and condition it for another signaling operation, said means being controlled by the valve for operation upon the movement of said valve from one position to another.

2. The combination with a valve of a fire-extinguisher system, of a transmitter adapted to transmit a plural-impulse signal, a signal-recorder, suitable circuit connections for said transmitter and recorder, and suitable connections between said transmitter and valve whereby movement of the valve from one position to another conditions said transmitter to transmit a signal and condition itself for transmitting a second signal, and restoration of the valve conditions the parts for repetition of said action.

3. The combination with a valve of an automatic signal device arranged adjacent thereto having a spring-controlled oscillating handle, means operatively associated with said valve arranged to contact with said handle to move it a predetermined distance in one direction only upon the operation of the valve in one direction, and to escape said handle upon the operation of the valve in another direction, an electric circuit including in series therein said signal device, a source of electrical supply and an indicator responsive to the action of said signal device.

4. The combination with a valve having a vertically-movable stem and a signal device arranged adjacent to the valve having a spring-controlled oscillating handle, of an arm secured to the valve-stem, and a finger yieldable in one direction, mounted on said arm and arranged to project into the path of oscillation of the handle of the signal device, whereby said handle will be moved by the arm and finger upon the movement of the valve-stem in one direction only.

In testimony that we claim the foregoing as our own we affix our signatures in presence of two witnesses.

JAMES G. NOLEN.
JOHN D. NOLEN.

Witnesses for James G. Nolen:
 FORÉE BAIN,
 MARY F. ALLEN.
Witnesses for John D. Nolen:
 DECLAN ALLEN,
 LORETTO HENNESSY.